United States Patent Office 3,473,417
Patented Oct. 21, 1969

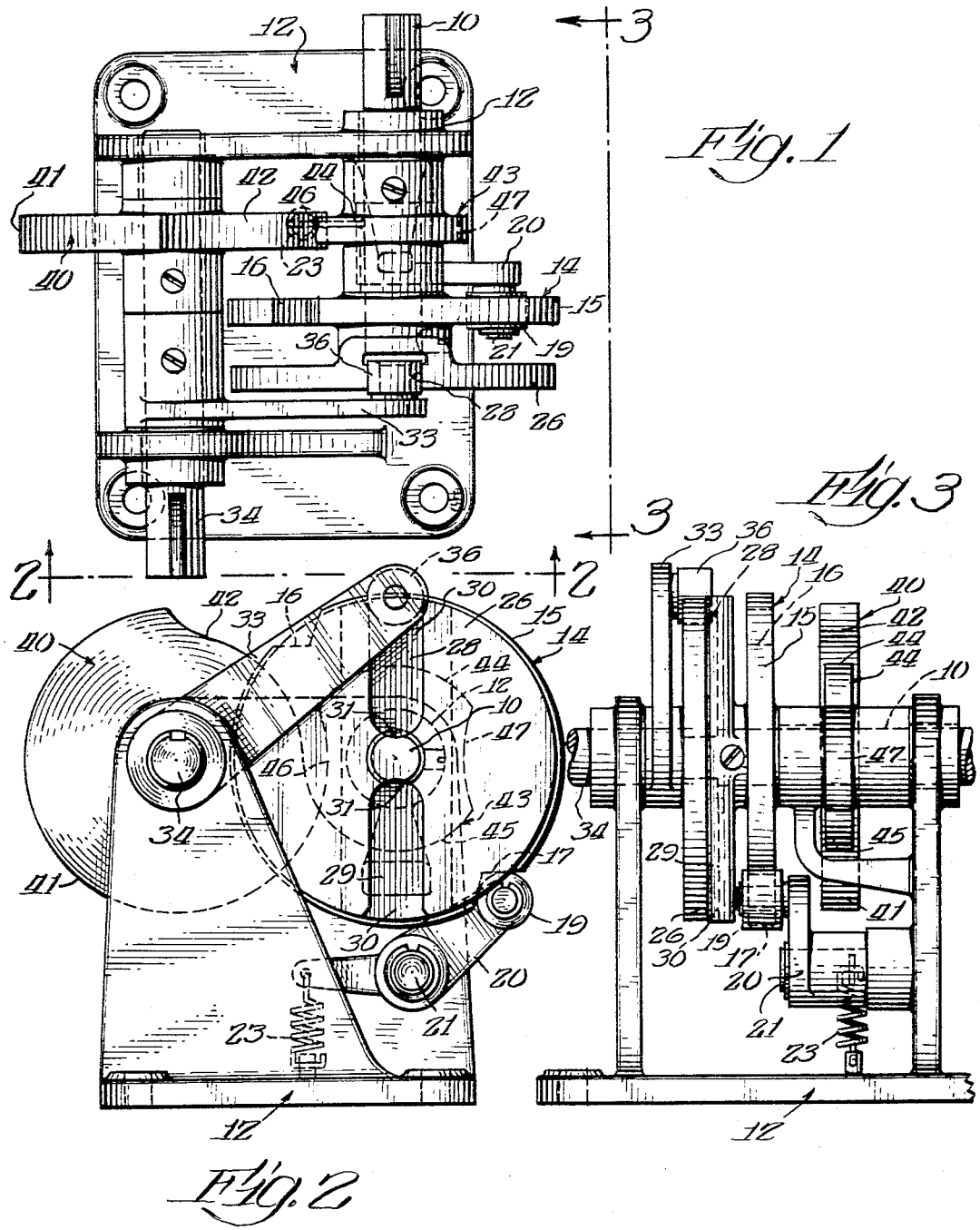

3,473,417
TWO-POSITION INTERMITTENT MOVEMENT
Ralph W. Peterson, Union, Ill., assignor to Ludlum Steel Corporation, Pittsburgh, Pa., a corporation of Pennsylvania
Filed Mar. 21, 1968, Ser. No. 714,904
Int. Cl. B23q *17/00;* F16h *55/00*
U.S. Cl. 74—820                              5 Claims

ABSTRACT OF THE DISCLOSURE

The invention provides a mechanism wherein a crank arm rotates a plate 180° for each revolution of the crank shaft. The plate has radial slots and the arrangement of the cooperating parts is such that the crank arm only engages the plate for 180° rotation of the plate after which the crank arm is free of the plate for the remaining 180°. Index means are provided for maintaining the plate in fixed index position.

SPECIFICATION

This invention relates to a two-position intermittent movement and is adapted to index a part at 180° intervals. The mechanism embodying the present invention is simple and is primarily useful in light mechanism operating at low speeds of the order of about 100 r.p.m. or slower. The simplicity of the mechanism is such that it is susceptible to being sealed in oil to operate for long periods of time without attention.

The invention generally includes a driven shaft carrying index means having 180° index positions and a plate having two slots extending along a straight line through the axis of the driven shaft and perpendicular thereto. Cooperating with the slotted plate is a crank arm carried by a driving shaft parallel to but laterally offset from the driven shaft. The crank arm has a roller at its end for cooperating with the plate slots. The geometry of the crank arm and roller arrangement relative to the plate slots is such that at every half revolution of the driving shaft the crank arm reaches the outer end of a plate slot and enters the slot to cause such plate to turn through an angle of 180°. Thereafter, continued rotation of the crank arm causes the roller to withdraw from the plate slot and continue to the position to enter the other slot of the plate. Plate rotation is effected by the crank roller during roller engagement with a plate slot. Except when such roller engagement occurs in a plate slot, crank movement has no effect upon plate rotation.

Means are provided for positively locking the plate against rotation when the crank arm is not coupled for driving said plate.

For an understanding of the invention, reference will now be made to the drawing wherein an exemplary embodiment is illustrated.

Referring now to the drawing, FIG. 1 is a top plan view of a device embodying the present invention.

FIG. 2 is an end elevation on line 2—2 of FIG. 1.

FIG. 3 is a side elevation along line 3—3 of FIG. 1.

Shaft 10 is a driven shaft journalled in any suitable manner in bearing block 12. Driven shaft 10 has rigidly secured thereto index cam disc 14 having peripheral edge 15 provided with diametrically disposed index slots 16 and 17. The dimensions of slots 16 and 17 may vary and will depend to a substantial degree upon the dimensions of index roller 19 carried at the end of arm 20 pivotally secured at 21 for movement radially of index 14. Arm 20 is spring biased in any suitable fashion, as by spring 23, to move roller 19 against peripheral surface 15 of index disc 14. Roller 19 is so dimensioned with respect to index slots 16 and 17 that the roller can cooperate therewith for entering an index slot to position index disc 14 in an index position. The amount of spring bias on arm 20 will depend on the load and, in general, should be sufficient to maintain the index disc in index position but permit the disc to be moved away from the index position.

The mechanical movement includes driven plate 26 rigidly secured to driven shaft 10. Plate 26 is disposed against one face of index disc 14 and has radial slots 28 and 29 aligned along a line perpendicular to the axis of shaft 10 and passing through the same. Slots 28 and 29 are similar in regard to dimensions and shape and have outer end portions 30 and inner end portions 31. Inner end portions 31 stop short of the plate center.

Plate 26 has its face available for cooperation with crank arm 33 rotatably secured to driving shaft 34 parallel to but laterally offset from driven shaft 10. Both driving and driven shafts may be supported in the same bearing block. Crank arm 33 carries roller 36 at its free end extending toward plate 26. The length of crank arm 33, the distance between slot ends 30 (in this instance the radius of plate 26) and the geometry of the slots is such that at an appropriate part of a complete revolution of crank arm 33, roller 36 can enter outer end 30 of a plate slot. As crank arm 33 continues to rotate, roller 36 entering a slot (as 28, for example) provides a crank coupling to turn plate 26. The depth of the slots are so chosen that as crank arm 33 continues turning, roller 36 will first enter a slot and move toward blind end 31 of the slot and then, after the slot and crank arm are parallel, further rotation of crank 33 will result in roller 36 continuing to turn plate 26 and move the roller outwardly toward outer end 30 of the slot. After the crank arm and plate have turned through appropriate angles, roller 36 will disengage from a slot and the crank arm will continue to rotate until roller 36 encounters a plate slot to repeat the plate driving cycle.

The indexing action occurring between roller 19 and index slots 16 and 17 are so designed that plate 26 is indexed to a proper position where roller 36 from the crank arm can engage and then disengage a plate slot. This position will be on a line between slots which is perpendicular to the line of shaft centers.

The movement is inherently a two-position device so that plate 26 will always have two slots. The depth of each slot should be great enough so that rotation of crank arm 33 will permit proper travel of roller 36 inwardly of a slot. By controlling the distance between the slot outer ends 30, the amount of offset between shafts 10 and 34, thus determining the length of crank arm 33, the relationship between the angular extents of active and inactive crank arm rotation can be controlled. From geometrical considerations, it is apparent that out of 360° of travel of crank arm 33, less than 180° will be available for turning plate 26. While angular registration of the index slots 16 and 17 on the one hand and plate driving slots 28 and 29 are not illustrated, it is evident that such orientation is not necessary. Thus, index arm 20 and pivot 21 may be so disposed that the index slots do not register angularly with the plate driving slots. However, it is necessary that plate driving slots 28 and 29 be indexed along a line which is perpendicular to the line extending between the laterally offset shafts. This will always insure that roller 36 carried by crank arm 33 will be in a position properly to engage and disengage a plate slot.

Outer end portion 30 of plate slots 28 and 29 may be shaped and provided with suitable means for facilitating the engagement of roller 36 carried by crank arm 33 into a slot. Thus, end 30 of the slot is preferably flared laterally to provide a wider slot opening. This will reduce the requirements for accuracy in index action. Index roller 23 and driving roller 36 may have suitable anti-friction means such as ball bearings or the like and promote smooth action of the mechanism. The various parts of the mechanism may be made of metal or plastic and provide a simple and foolproof means for obtaining an intermittent motion. While index cam disc 14 is illustrated as being larger in radius than intermittent drive plate 26, it is understood that this relationship is not essential. The two parts may have equal or unequal radii.

While the slots in driven plate 26 must lie along a straight line passing through the axis of the driven shaft and perpendicular thereto, it is not necessary that the crank arm during engagement with driven disc 26 need travel any particular angle less than 180°. The greater the offset between the two shafts as compared to the distance between the outer ends of the slots in driven plate 26 (in this instance the diameter of plate 26) the smaller will be the angle through which the crank arm must travel between initial engagement and final disengagement of the end of the crank arm and plate slots. The angle through which the crank arm must travel during driving engagement with plate 26 can never be 180° since the lateral offset between the two shafts will always have to be larger than the radius of plate 26 due to the physical dimensions of the driving shaft. While plate 26 is shown as being circular, it is evident that the dimensions of plate 26 laterally of the driven shaft axis may be reduced except where the slots are located. Thus a bar secured for rotation to the driven shaft and having its ends provided with slots can function satisfactorily.

If the crank arm is very long in comparison to the radius of the driven plate, then the arc over which the end of the crank arm travels when driving may reduce the force component for driving the plate to an insufficient value. In general, the mechanism may be considered as a sort of modified Geneva movement wherein the portion of the driven plate remote from the axis of the driver is utilized. It is possible to increase the number of slots in the driven plate to be engaged by the crank arm in which case the radius of the crank arm compared to the radius of the driven plate would permit a crank arm to engage a slot on one side of the center line between the driven plate and the crank arm and cause the driven plate to be moved so that the slot is moved to the other side of the center line. In providing such a construction, the depth of the slot in the driven plate must be properly selected with relation to the driven plate radius and the crank arm radius as to provide for the driven plate being advanced one slot at a time.

It is possible to provide positive locking between driven plate 14 and driving crank arm 33. To this end, driving shaft 34 has rigidly secured thereto driving locking cam plate 40. Locking plate 40 has its periphery shaped to provide arcuate locking portion 41 and arcuate clearing portion 42. Driving locking plate 40 cooperates with driven locking plate 43 rigidly secured to driven shaft 10, having equal arcuate portions 44 and 45 separated by equal arcuate undercut portions 46 and 47. Driving locking portion 41 has a radius with respect to driving shaft 34 which is somewhat less than the radius of undercut portions 46 and 47. The center of curvature of undercut portion 46 in the position illustrated in FIG. 2 is substantially at the axis of driving shaft 34. The same is true for undercut portion 47 when this portion is in the position corresponding to undercut portion 46. The actual locus of the center of curvature for undercut portions 46 and 47 is a circle whose center is at driven shaft 10 and whose radius is substantially the distance between shafts 10 and 34.

The radius of portion 42 of the clearing part of driving locking plate 40 is a bit less than the radial distance from driving shaft 34 to the nearest one of arcuate portions 44 or 45 when driven locking plate 43 has been turned 90° from the position illustrated in FIG. 2. The angular extents of the arcuate portions in the two locking plates will be determined by the angular relationships involved in the mechanics of the intermittent drive. Insofar as locking plates 40 and 43 are concerned, this particular locking arrangement is well known in Geneva movements and the angular extents of the various arcuate portions 41, 42, 44, 45, 46 and 47 can be easily calculated. When driven shaft 10 is to turn, driving clearing portion 42 will be tangent to (or usually clear) driven clearing portion 44 or 45.

By having locking plates 40 and 43, index means for driven shaft 10 consisting of parts 14, 19 and 20 may, if desired be eliminated. It is also possible to omit locking plates 40 and 43 and rely upon index means 14, 19 and 20. However, both index controls are desirable. Thus index means 14, 19 and 20 may be quite precise without requiring extreme accuracy of parts.

What is claimed is:

1. A two-position intermittent movement comprising a driven shaft, index means for said shaft to provide an index position at each 180° of shaft rotation, a plate rigidly secured to said shaft for rotation therewith, said plate having a pair of slots extending inwardly from the plate edge toward the shaft axis, said slots being disposed equidistant from the shaft axis along a straight line passing through the shaft axis perpendicular thereto, a second shaft laterally offset from but parallel to said first shaft, the distance between said two shaft axes being greater than the distance from the axis of the first shaft to the outer end of said slots, and a crank arm rigidly secured to said second shaft for rotation therewith, said crank arm extending laterally from the shaft and having an end position parallel to the shaft axis, the index positions of said first shaft being such that the line along which said plate slots lie at index positions is perpendicular to the line of centers between the two shafts, said crank arm, shaft offset and slot depth being so proportioned that during rotation of said second shaft, the crank end portion can begin to enter a plate slot at an index position and with continued crank rotation can extend into said slot and drive said slotted plate to turn the same to the next index position at which position said crank arm end portion disengages from said slot and the crank arm continues its rotation about the second shaft axis free of any driving connection with said slotted plate until the crank arm reaches a position for slot entry.

2. The structure according to claim 1 wherein said plate has the outer ends of each slot flared laterally for facilitating entry of such crank end portion into a slot.

3. The construction according to claim 1 wherein said index means includes a cam disc coaxial with said shaft, said cam disc having cam slots 180° apart and a member riding along the edge of said cam disc and biased toward the shaft axis for engagement with an index slot.

4. A modified Geneva type of intermittent motion comprising a driving crank arm rotatable about a predetermined driving axis, said crank arm having an active end portion, a driven member intermittently rotatable about a driven axis laterally offset from and parallel to the driving axis, said driven member having a plurality of slots extending inwardly from the edge of said driven member toward the driven axis, said crank arm having a radius which is greater than the distance from the driven axis to the outer end of any slot, the lateral separation between the two axes being sufficiently great so that the locus of the path of the active end of said crank arm during crank rotation intersects the locus of the path of the driven member slots at regions beyond the driven axis and on opposite sides of the extension of the line of centers between said two axes whereby the active end portion of the crank arm during less than 180° of crank arm rotation can engage a slot in the driven member and couple the crank arm to said driven member to rotate the same through an angle when measured with respect to the driven axis which is determined by the points of engagement and dis-engagement between the active end of said crank arm and a particular slot in said driven member, said angle never being greater than 180° and being smaller with increase in number of slots.

5. The construction according to claim 1 wherein locking means for index action is provided, said locking means comprising a driving locking plate rigidly secured to said driving shaft, said driving locking plate having a peripheral locking portion of one radius and a peripheral clearing portion of a smaller radius, a driven locking plate rigidly secured to said driven shaft and having two diametrically spaced arcuate clearing portions and two arcuate undercut locking portions between the ends of said clearing portions, the angular extents and dimensions of such two locking plates being such that said driving locking plate has its peripheral locking portion cooperating with an undercut driven plate locking portion when no rotation of the driven shaft is to occur and wherein the driving locking plate clear portion can be opposite to and clear the clearing portion of said driven locking plate to permit turning of said driven shaft.

References Cited
UNITED STATES PATENTS

| | | | |
|---|---|---|---|
| 1,198,797 | 9/1916 | Waterman. | |
| 1,789,485 | 1/1931 | Wren | 74—820 XR |
| 2,660,926 | 12/1953 | Talley | 74—436 XR |

FRED C. MATTERN, Jr., Primary Examiner

F. D. SHOEMAKER, Assistant Examiner

U.S. Cl. X.R.

74—436, 827

UNITED STATES PATENT OFFICE
CERTIFICATE OF CORRECTION

Patent No. 3,473,417

October 21, 1969

Ralph W. Peterson

It is certified that error appears in the above identified patent and that said Letters Patent are hereby corrected as shown below:

In the heading to the printed specification, lines 3 to 5, "assignor to Ludlum Steel Corporation, Pittsburgh, Pa., a corporation of Pennsylvania" should read -- assignor to Allegheny Ludlum Steel Corporation, Pittsburgh, Pa., a corporation of Pennsylvania --.

Signed and sealed this 20th day of October 1970.

(SEAL)
Attest:

Edward M. Fletcher, Jr.
Attesting Officer

WILLIAM E. SCHUYLER, JR.
Commissioner of Patents